US011975569B2

(12) United States Patent
Okawara

(10) Patent No.: US 11,975,569 B2
(45) Date of Patent: May 7, 2024

(54) PNEUMATIC TIRE

(71) Applicant: Sumitomo Rubber Industries, Ltd., Kobe (JP)

(72) Inventor: Renya Okawara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/939,093

(22) Filed: Sep. 7, 2022

(65) Prior Publication Data

US 2023/0109562 A1  Apr. 6, 2023

(30) Foreign Application Priority Data

Oct. 4, 2021 (JP) .................. 2021-163609

(51) Int. Cl.
*B60C 11/01* (2006.01)
*B60C 11/03* (2006.01)
*B60C 13/02* (2006.01)

(52) U.S. Cl.
CPC .............. *B60C 11/01* (2013.01); *B60C 11/03* (2013.01); *B60C 13/02* (2013.01); *B60C 2011/0358* (2013.01)

(58) Field of Classification Search
CPC ..... B60C 13/00; B60C 13/001; B60C 13/002; B60C 13/02; B60C 13/023; B60C 11/01
See application file for complete search history.

(56) References Cited

U.S. PATENT DOCUMENTS

2017/0166013 A1* 6/2017 Kuwano ................ B60C 13/02
2019/0389253 A1  12/2019 Wada
2022/0118796 A1  4/2022 Sakamoto et al.

FOREIGN PATENT DOCUMENTS

| EP | 3 219 516 A1 | 9/2017 |
| JP | 2004-291937 A | 10/2004 |
| JP | 2017-121876 | * 7/2017 |
| JP | 2019-73119 A | 5/2019 |
| JP | 6652823 | * 2/2020 |
| JP | 2020-44882 A | 3/2020 |
| JP | 6778557 | * 11/2020 |

OTHER PUBLICATIONS

Machine translation of JP 2004-291937, 2004.*
Machine translation of JP 2017-121876, 2017.*
Extended European Search Report for corresponding European Application No. 22188770.6, dated Dec. 16, 2022.

* cited by examiner

*Primary Examiner* — Justin R Fischer
(74) *Attorney, Agent, or Firm* — Birch, Stewart, Kolasch & Birch, LLP

(57) ABSTRACT

A pneumatic tire includes a tread portion having a first tread edge, and a first buttress portion extending inwardly in a tire radial direction from the first tread edge. The first buttress portion is provided with a plurality of protectors protruding outwardly in a tire axial direction. The plurality of protectors includes a set of protectors including a first protector and a second protector arranged adjacent to the first protector via a groove extending in the tire radial direction. The groove is provided with a tie-bar connecting the first protector and the second protector. The tie-bar is partially formed in a tire radial region of the groove, and the tie-bar has a protruding height that is smaller than a protruding height of the first protector and a protruding height of the second protector.

15 Claims, 9 Drawing Sheets

PNEUMATIC TIRE

RELATED APPLICATIONS

This application claims the benefit of foreign priority to Japanese Patent Application No. JP2021-163609, filed Oct. 4, 2021, which is incorporated by reference in its entirety.

FIELD OF THE DISCLOSURE

The present disclosure relates to a pneumatic tire.

BACKGROUND OF THE DISCLOSURE

The patent document 1 below discloses a pneumatic tire which includes a side region being provided with a plurality of side blocks partitioned by a plurality of side grooves. The pneumatic tire disclosed in Patent Document 1 expects to improve the driving performance and the cut resistance on unpaved roads including muddy ground.

CITED REFERENCE

Patent Document

[Patent document 1] Japanese Unexamined Patent Application Publication 2020-44882

SUMMARY OF THE DISCLOSURE

For pneumatic tires that run on rough terrain such as muddy terrain, a plurality of protectors is provided on the sidewalls in order to improve the cut resistance and mud performance of the sidewalls. Unfortunately, there has been a problem that such protectors cause an increase in tire mass.

The present disclosure has been made in view of the above problem and has a major object to provide a pneumatic tire capable of improving mud traction performance and cut resistance performance while suppressing an increase in tire mass.

In one aspect of the disclosure, a pneumatic tire includes a tread portion having a first tread edge, and a first buttress portion extending inwardly in a tire radial direction from the first tread edge. The first buttress portion is provided with a plurality of protectors protruding outwardly in a tire axial direction. The plurality of protectors includes a set of protectors including a first protector and a second protector arranged adjacent to the first protector via a groove extending in the tire radial direction. The groove is provided with a tie-bar connecting the first protector and the second protector. The tie-bar is partially formed in a tire radial region of the groove, and the tie-bar has a protruding height that is smaller than a protruding height of the first protector and a protruding height of the second protector.

DETAILED DESCRIPTION OF THE DISCLOSURE

Hereinafter, one or more embodiments of the present disclosure will be described with reference to the drawings.

Figure 1:
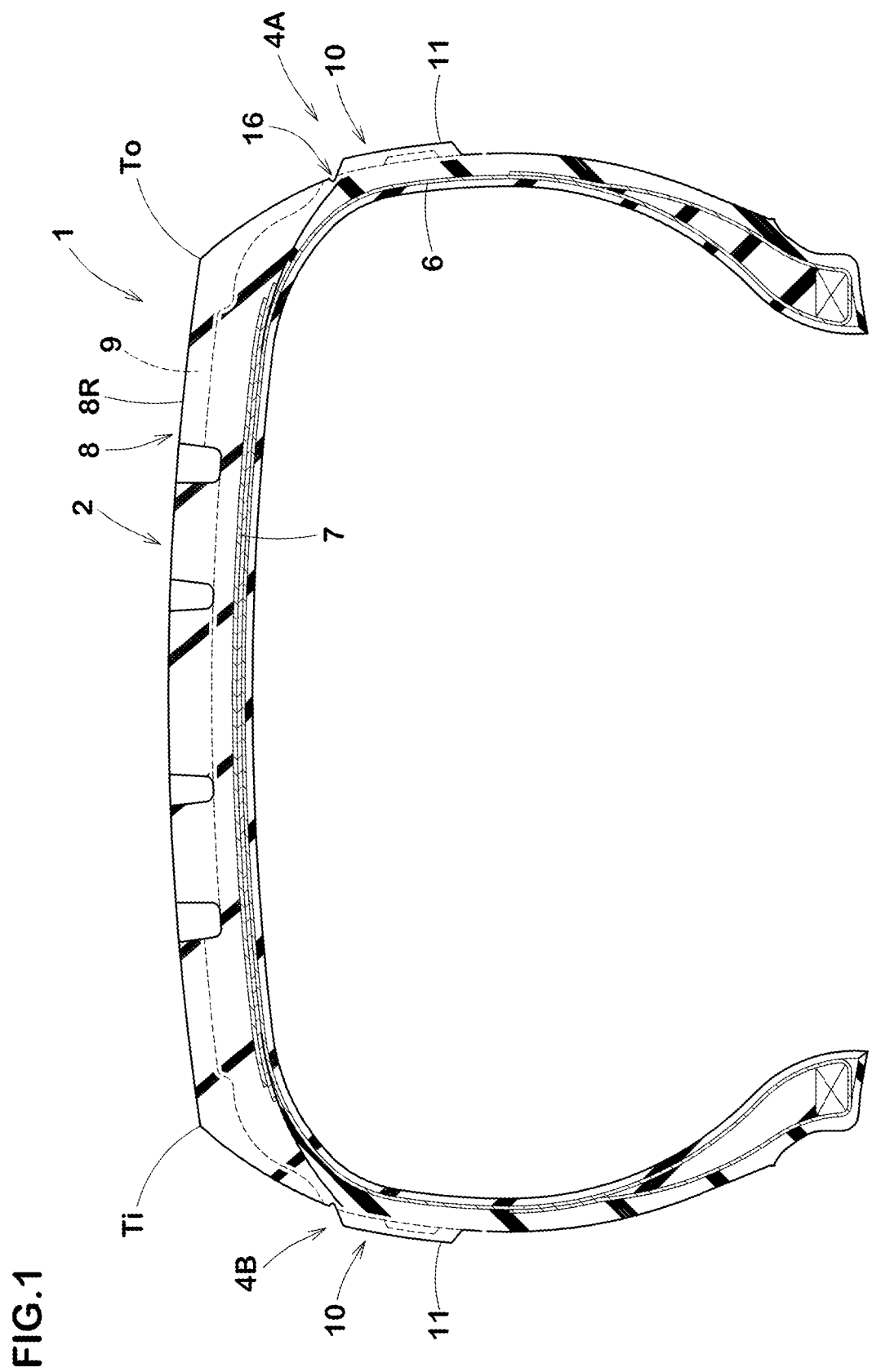
FIG. 1 is a tire meridian cross-sectional view illustrating an embodiment of a pneumatic tire according to the present disclosure.

FIG. 1 is a tire meridian cross-sectional view including the tire axis of an embodiment of a pneumatic tire (hereafter, may be simply referred to as "tire") under a normal state. FIG. 1 illustrates, as a preferred embodiment, a pneumatic tire mounted on a 4WD vehicle or the like that enables driving on rough terrain. Alternatively, the present disclosure can be applied to tires 1 including those for light trucks and heavy loads.

As used herein, the "normal state" is such that the tire 1 is mounted onto a standard wheel rim (not illustrated) with a standard pressure but loaded with no tire load. As used herein, unless otherwise noted, dimensions of portions of the tire 1 are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

In the present embodiment, the tire 1 includes some tire components such as a carcass 6, a belt layer and the like. Known members are appropriately adopted for these tire components.

In the present embodiment, the tire 1 includes a tread portion 2 having a first tread edge To, and a first buttress portion 4A extending inwardly in the tire radial direction from the first tread edge To. Further, the tire 1, for example, includes a second tread edge Ti and a second buttress portion 4B extending inwardly in the tire radial direction from the second tread edge Ti. In the present embodiment, the second buttress portion 4B is formed in the same manner as the first buttress portion 4A, so the explanation thereof is omitted herein. Alternatively, the second buttress portion 4B may be formed in a different manner from the first buttress portion 4A.

The first tread edge To and the second tread edge Ti are the axial outermost edges of the ground contacting patch of the tire 1 which occurs under the condition such that the tire 1 under the normal state is grounded on a plane with a standard tire load at zero camber angles. The tread portion 2 is formed between the first tread edge To and the second tread edge Ti.

As used herein, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example.

Figure 2:
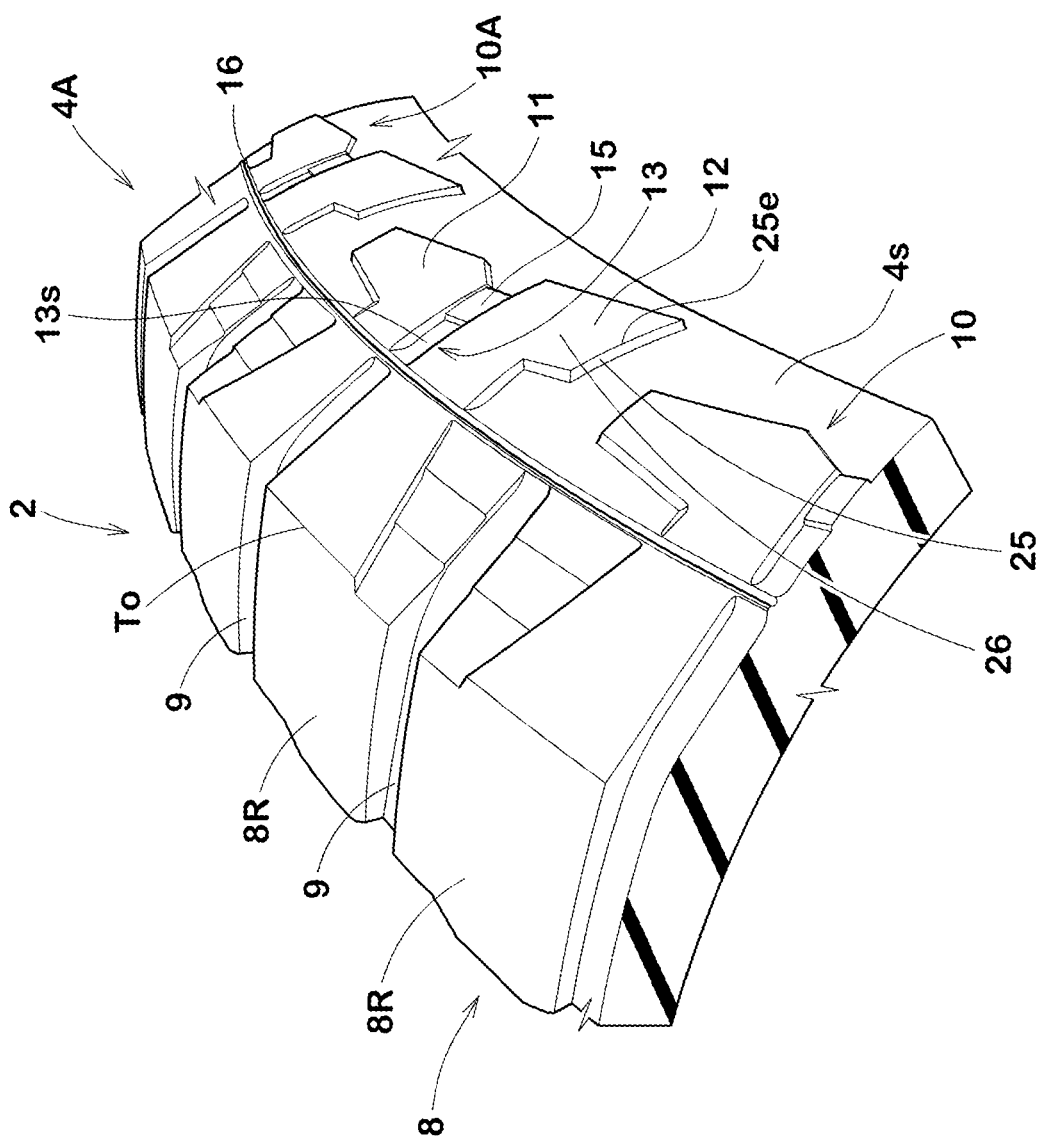
FIG. 2 is a perspective view of a first buttress portion.
Figure 3:
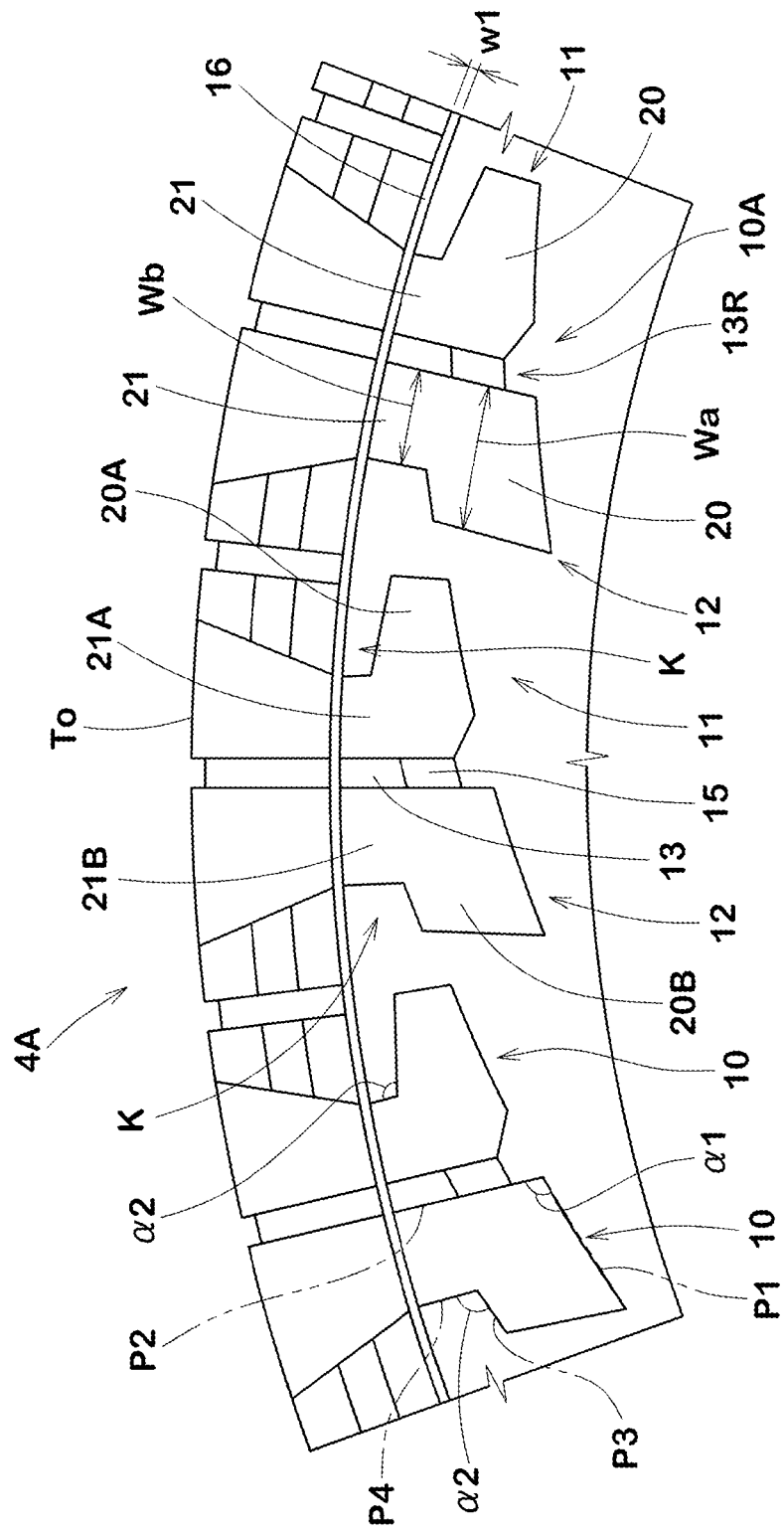
FIG. 3 is a front view of the first buttress portion.

FIG. 2 is a perspective view of the first buttress portion 4A. FIG. 3 is a front view of the first buttress portion 4A. As illustrated in FIG. 1 to FIG. 3, the first buttress portion 4A according to the present embodiment is provided with a plurality of protectors 10 protruding outwardly in the tire axial direction. The plurality of protectors 10 comprises at least one set 10A of protectors that includes a first protector 11 and a second protector 12 arranged adjacent to the first protector 11 via a groove 13 extending in the tire radial direction.

The groove 13 is provided with a tie-bar 15 connecting the first protector 11 and the second protector 12. Such a tie-bar 15 can enhance the tire circumferential rigidity of the first protector 11 and the second protector 12, and thus the chipping of each protector 10 can be suppressed and the cut resistance of the first buttress portion 4A can be improved. In addition, the tie-bar 15 can increase the rigidity of the first protector 11 and the second protector 12, which can increase the shear force on the muddy road surface using protectors 10 and can improve the mud traction performance.

The tie-bar 15 is partially formed in a tire radial region 13R of the groove 13. In addition, the tie-bar 15 has a protruding height h2 (shown in FIG. 7) that is smaller than protruding heights h1 of the first protector 11 and the second protector 12. Such a tie-bar 15 can suppress the increase in tire mass.

The first buttress portion 4A is provided with a recess 16 that is recessed inwardly in the tire axial direction. In the present embodiment, the recess 16 extends continuously in the tire circumferential direction. Although not particularly limited, a width w1 of the recess 16 in the tire radial direction is in a range from 1.0 to 3.0 mm. A depth dl of the recess 16 (shown in FIG. 7) is in a range from 0.5 to 2.0 mm. Such a recess 16 can change the visual sense of the first buttress portion 4A and can enhance the appearance. The depth dl of the recess 16 is the depth from an outer surface 8A of a shoulder block 8R described later.

The protectors 10, in the present embodiment, are located inwardly of the recess 16 in the tire radial direction. The plurality of protectors, for example, includes only a plurality of sets 10A of protectors each of which consists of the first protector 11 and the second protector 12. Note that the plurality of protectors 10 is not limited to such an embodiment, and may include a third protectors (not shown) having a shape different from those of the first protector 11 and the second protector 12.

Each of the first protector 11 and the second protector 12 includes an inner portion 20 and an outer portion 21 located outwardly in the tire radial direction of the inner portion 20. Note that the inner portion 20 and the outer portion 21 can be virtually divided by a tire circumferential direction line "n" passing through the intersection T of an outer edge portion 36 and an intermediate edge portion 38, which will be described later (shown in FIG. 5).

A maximum length Wa in the tire circumferential direction of the inner portion 20 is greater than a maximum length Wb in the tire circumferential direction of the outer portion 21. Such an inner portion 20 can enhance the rigidity of the outer portion 21 which easily comes into contact with mud, etc., and further enhance the mud traction performance and the cut resistance performance. Also, the appearance performance of the protectors 10 can be enhanced.

In each protector 10, the maximum length Wb of the outer portion 21 is preferably equal to or more than 50%, more preferably equal to or more than 60%, of the maximum length Wa of the inner portion 20, but preferably equal to or less than 80%, more preferably equal to or less than 70% of the maximum length Wa. As a result, the above-mentioned effects are effectively exhibited. In this embodiment, the maximum length Wa of the inner portion 20 is 23.9 to 33.9 mm.

In a front view of the first buttress portion 4A, each first protector 11 has an L-shape in which the inner portion 20A thereof protrudes from the outer portion 21A thereof to the opposite side of the groove 13 in the tire circumferential direction. Each second protector 12 has an inverted L-shape in which the inner portion 20B thereof protrudes from the outer portion 21B thereof to the opposite side of the groove 13 in the tire circumferential direction. Thus, in each of the first protectors 11 and the second protectors 12, at the position where the inner portion 20 and the outer portion 21 are connected, there is an open region K that is open to the outside in the tire radial direction and opposite to the groove 13 in the tire circumferential direction. In such an open region K, the shearing force against mud and the like is exerted, so that the mud traction performance can be enhanced. As used herein, the "L-shape" and "inverted L-shape" preferably has angles $\alpha 1$ and $\alpha 2$ thereof in a range from 80 to 120 degrees, where the angle $\alpha 1$ is an angle between a straight line P1 connecting both ends of inner circumferential edge 30 described later and a straight line P2 connecting both ends of inner radial edge 32 (shown in FIG. 4), and the angle $\alpha 2$ is an angle between a straight line P3 connecting both ends of an outer circumferential edge 36 described later and a straight line P4 connecting both ends of an intermediate edge 38 (shown in FIG. 5).

As illustrated in FIG. 2, each of the first protector 11 and the second protector 12 includes a side surface 25 that extends to an outer edge 25e thereof in the tire axial direction from an outer surface 4s of the first buttress portion 4A, and a top surface 26 enclosed by the outer edge 25e of the side surface 25. The outer surface 4s refers herein to a surface that extends smoothly except for local irregularities including raised marks such as emblems and uneven patterns in the normal state. The outer surface 4s forms a groove bottom 13s of the groove 13 in this embodiment.

Figure 4:
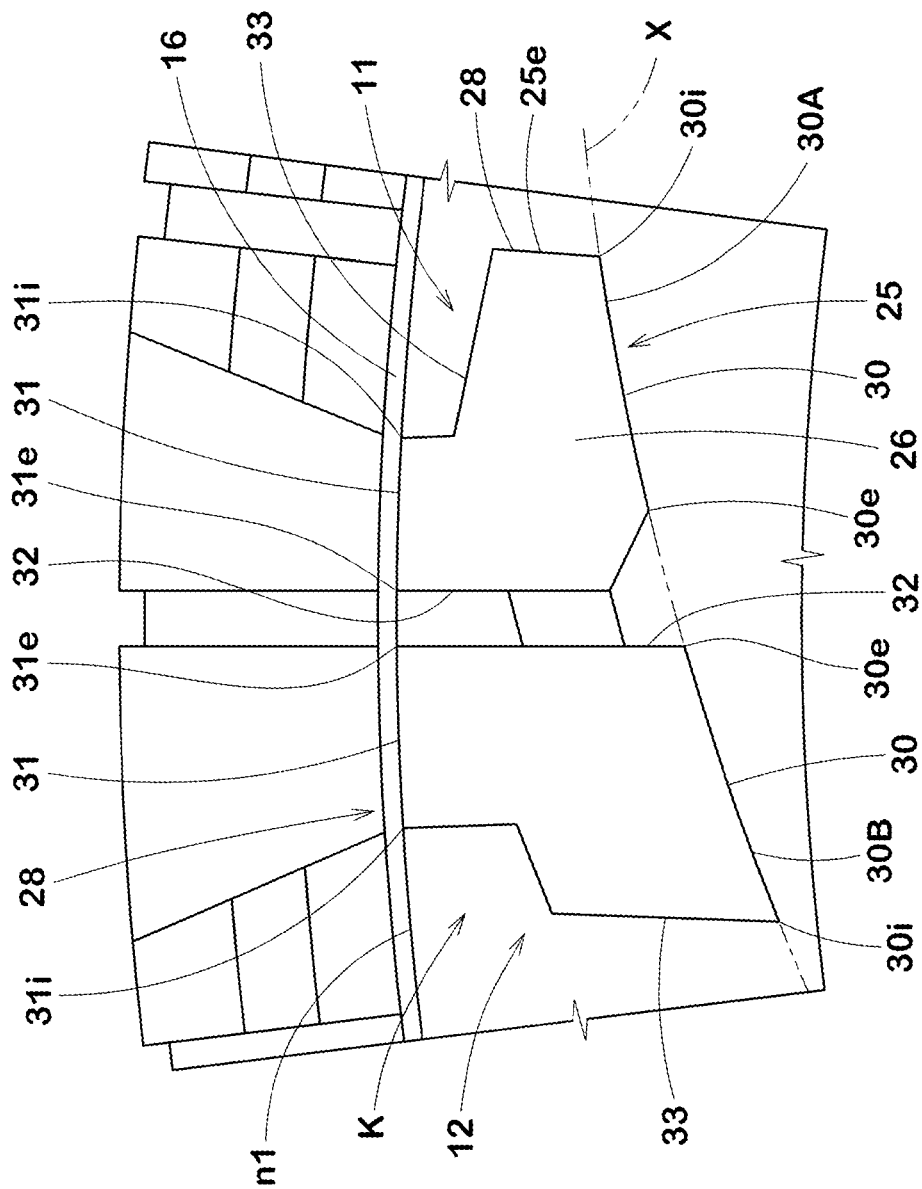
FIG. 4 is an enlarged view of FIG. 3.

FIG. 4 is an enlarged view of FIG. 3. As illustrated in FIG. 4, the outer edge 25e of the side surface 25 of each protector forms an edge 28 where the side surface 25 intersects the top surface 26. Each edge 28 of the first protector 11 and the second protector 12, in the present embodiment, includes an inner circumferential edge 30, an outer circumferential edge 31, an inner radial edge 32 and the outer radial edge 33. The inner circumferential edge 30, for example, extends in the tire circumferential direction on radially innermost of each of the protectors 11 and 12. The outer circumferential edge 31, for example, extends in the tire circumferential direction on radially outermost of each of the protectors 11 and 12. The inner radial edge 32, for example, is adjacent to the groove 13 and connects a first end 30e of the inner circumferential edge 30 and a first end 31e of the outer circumferential edge 31. The outer radial edge 33 is adjacent to the open region K and connects a second end 30i of the inner circumferential edge 30 and a second end 31i of the outer circumferential edge 31.

In the present embodiment, the inner circumferential edge 30A of the first protector 11 and the inner circumferential edge 30B of the second protector 12 extend so as to form a single virtual line, e.g., extending to form a single arc-shaped virtual line X. These inner circumferential edges 30A and 30B can suppress the decrease in shear force when traveling in muddy ground, thus improving mud traction performance. As used herein, the "so as to form a single virtual line" includes an aspect in which each of the inner circumferential edges 30A and 30B is located on a single straight line or a circular arc having a single radius of curvature, and also includes a maximum separation distance between the virtual line X and each of the inner circumferential edges 30A, 30B within 2 mm. In this embodiment, the virtual line X is inclined with respect to the tire circumferential direction. Note that the virtual line X includes a straight line and a circular arc, but does not include broken lines and wavy lines.

The outer circumferential edge 31 of each of the first protector 11 and the second protector 12 defines the recess 16, for example. The outer circumferential edge 31 of each of the first protector 11 and the second protector 12 is formed on a tire circumferential direction line n1 in the present embodiment.

Figure 5:
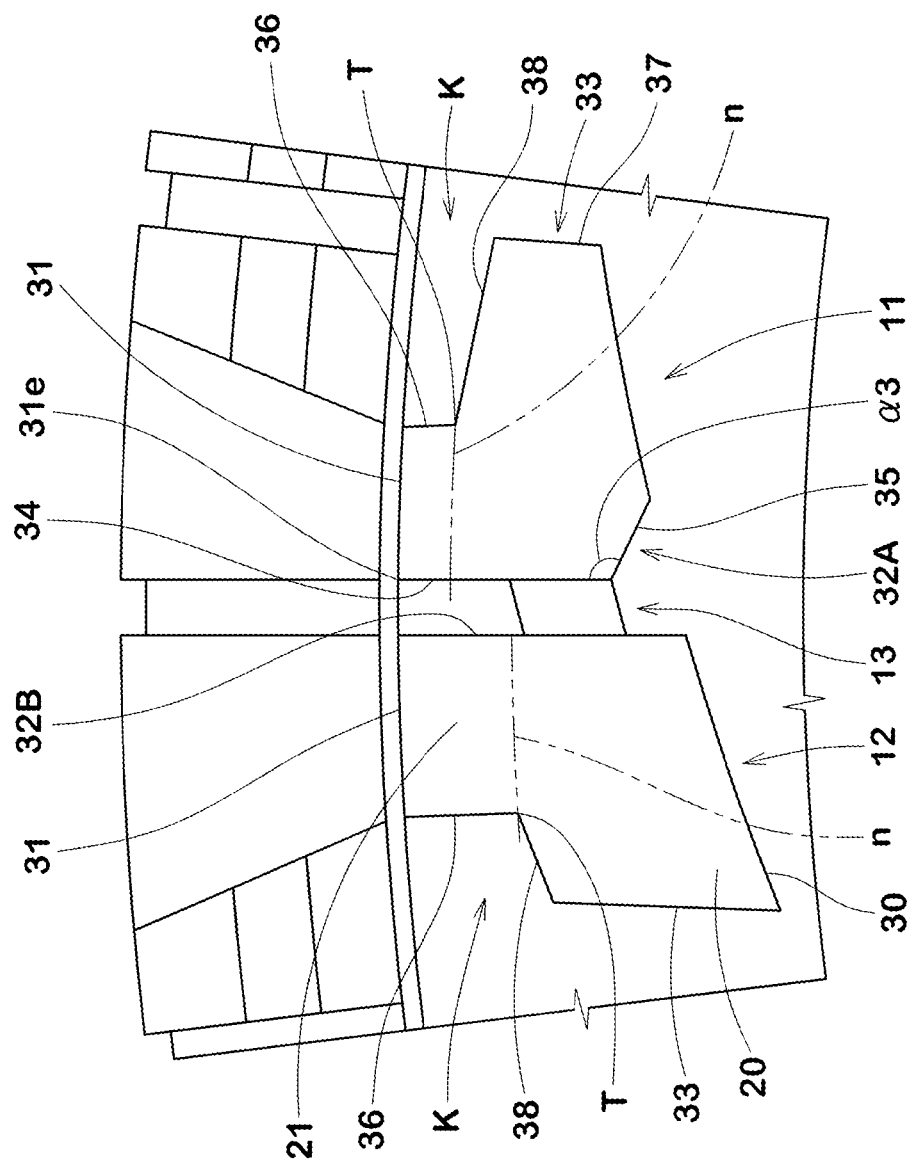
FIG. 5 is an enlarged view of FIG. 3.

FIG. 5 is an enlarged view of FIG. 3. As illustrated in FIG. 5, the inner radial edge 32A of the first protector 11 includes a first edge segment 34 and a second edge segment 35. The first edge segment 34, for example, extends inwardly in the tire radial direction straightly from the first end 31e of the outer circumferential edge 31. The second edge segment 35, for example, is connected to the first edge segment 34 and is inclined at a larger angle with respect to the tire radial direction than that of the first edge segment 34. Although it is not limited, an angle α3 between the first edge segment 34 and the second edge segment 35 is preferably formed at an obtuse angle. Such an inner radial edge 32A can increase a groove width of the groove 13 on an inner side in the tire radial direction. The angle α3 is preferably in a range from 100 to 130 degrees. The inner radial edge 32B of the second protector 12 extends entirely straight in the tire radial direction.

In the present embodiment, the first edge segment 34 of the first protector 11 and the inner radial edge 32B of the second protector 12 are parallel with each other. This can make the rigidity step of the first protector 11 and the second protector 12 smaller, so that high shear forces against mud can be exerted. As used herein, the "parallel" means not only the case where the difference of the angles to the tire radial direction of each other is 0 degrees, but also the case where the difference of the angles to the tire radial direction of each other is within 5 degrees.

Each outer radial edge 33 includes an outer edge segment 36 extending from the outer circumferential edge 31, an inner edge segment 37 extending from the inner circumferential edge 30, and an intermediate edge segment 38 connecting the outer edge segment 36 and the inner edge segment 37. The outer edge segment 36, the inner edge segment 37 and the intermediate edge segment 38, for example, each extend in a straight manner. In each outer radial edge 33, in the present embodiment, the open region K is surrounded by the outer edge segment 36 and the intermediate edge segment 38. In each of the protectors 11 and 12, the intermediate edge segment 38 is inclined inwardly in the tire radial direction toward the opposite side to the groove 13 in the tire circumferential direction. As a result, the volume of mud and the like that can be dug up by the intermediate edge segment 38 and the outer edge segment 36 increases, so that the mud traction performance and cut resistance performance can be improved.

Figure 6:
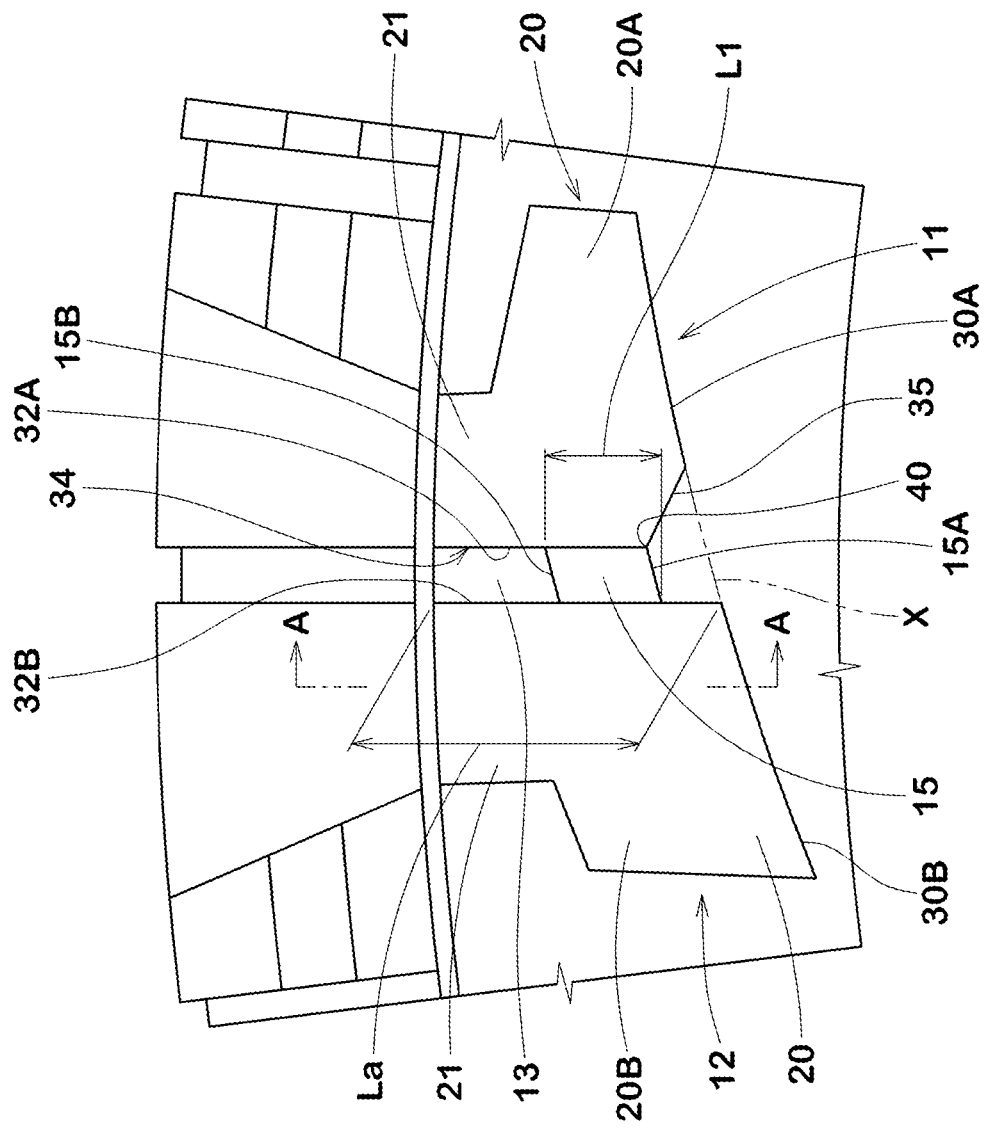
FIG. 6 is an enlarged view of FIG. 3.

FIG. 6 is an enlarged view of FIG. 3. As illustrated FIG. 6, the tie-bar 15 is connected to at least one of the inner portions 20. The tie-bar 15, for example, connects the inner portion 20A of the first protector 11 and the inner portion 20B of the second protector 12. Such a tie-bar 15 can increase the rigidity of the inner portion 20 and enhance the cut resistance and mud traction performance. Further, the tie-bar 15 is not connected to the outer portions 21. As a result, the outer portion 21, which has a relatively low rigidity, can maintains its elastically deformation due to the rotation of the tire 1, so that mud and the like in the groove 13 sandwiched between both the outer portions 21 are smoothly discharged.

The tie-bar 15, for example, includes an inner edge 15A and an outer edge 15B. The inner edge 15A and the outer edge 15B extend in the tire circumferential direction. The inner edge 15A, in the present embodiment, is connected to a location 40 where the first edge segment 34 and the second edge segment 35 are connected. The outer edge 15B is located outwardly of the inner edge 15A in the tire radial direction. The inner edge 15A and the outer edge 15B, for example, extend in parallel with each other. In the present embodiment, the inner edge 15A and the outer edge 15B extend in parallel with the virtual line X.

A length L1 in the tire radial direction of the tie-bar 15 is equal to or less than 50% of a length La in the tire radial direction of the groove 13. This can suppress the decrease in the volume of the groove 13, thus reducing the increase in tire mass. In order to reduce the increase in tire mass while improving mud traction performance and cut resistance, the length L1 of the tie-bar 15 is preferably equal to or more than 20% of the length La of the groove 13, more preferably equal to or more than 22%, but preferably equal to or less than 30%, more preferably equal to or less than 28%. As used herein, the length La of the groove 13 is the larger of the radial lengths of the inner radial edges 32A and 32B forming the groove 13.

Figure 7:
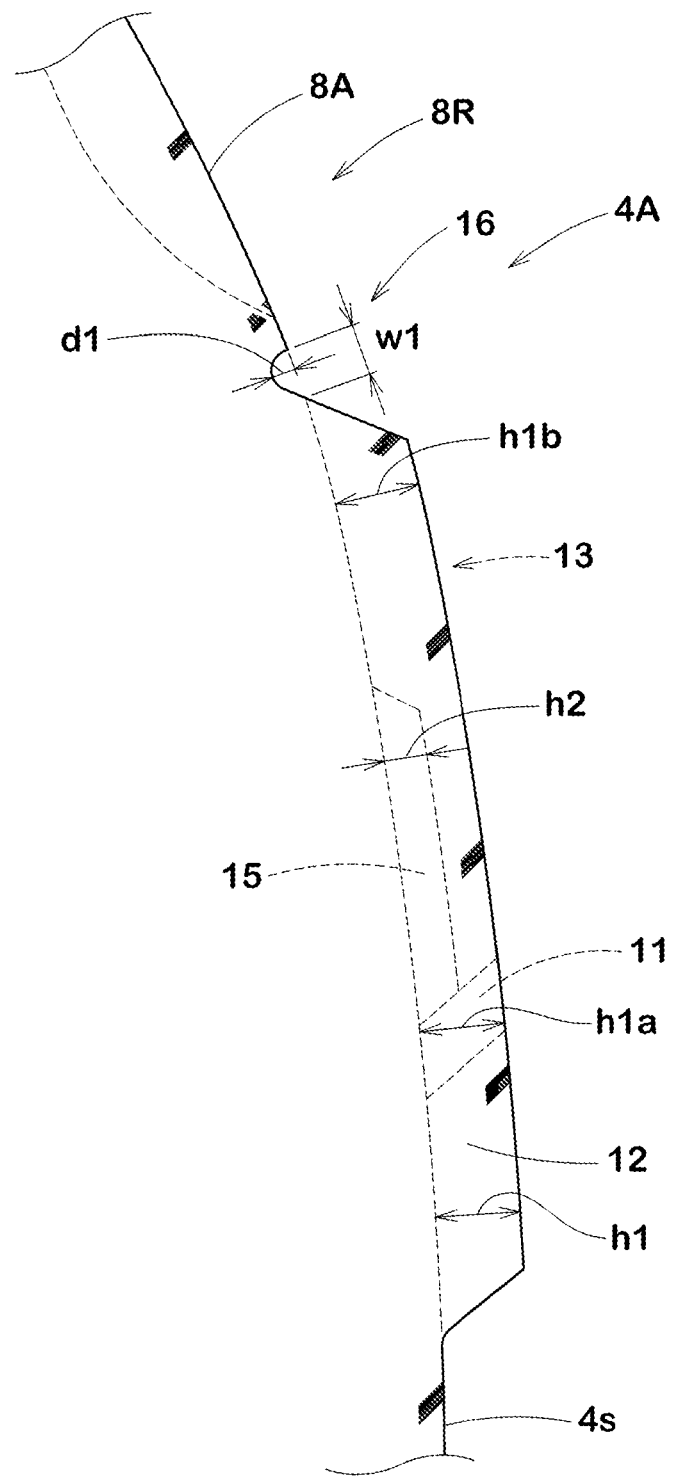
FIG. 7 is a cross-sectional view taken along the line A-A of FIG. 6.

FIG. 7 is a cross-sectional view taken along the line A-A of FIG. 6. As illustrated in FIG. 7, the differences (h1a-h2) between a protruding height h1a of the first protector 11 and a protruding height h2 of the tie-bar 15, and the differences (h1b-h2) between a protruding height h1b of the second protector 12 and the protruding height h2 of the tie-bar 15 are equal to or more than 0.5 mm. This can effectively exert the effect of suppressing the increase in tire mass. In order to improve mud traction performance and cut resistance, the difference (h1a-h2) and difference (h1b-h2) are more preferably equal to or more than 1.0, but preferably equal to or less than 2 mm, more preferably equal to or less than 1.5 mm.

The protruding height h1a of the first protector 11 and the protruding height h1b of the second protector 12 are both preferably equal to or more than 1.0 mm, more preferably equal to or more than 1.5 mm, but preferably equal to or less than 5.0 mm, more preferably equal to or less than 4.0 mm.

The protruding height h1a of the first protector 11 and the protruding height h1b of the second protector 12 are the same in this embodiment. The protruding height h1a of the first protector 11 and the protruding height h1b of the second protector 12 may be different from each other.

As illustrated in FIG. 1 and FIG. 2, the tread portion 2 includes a shoulder land portion 8 inside the tire axial direction from the first tread edge To. The shoulder land portion 8 is divided into a plurality of shoulder blocks 8R by a plurality of shoulder lateral grooves 9 communicated with the first tread edge To.

Figure 8:
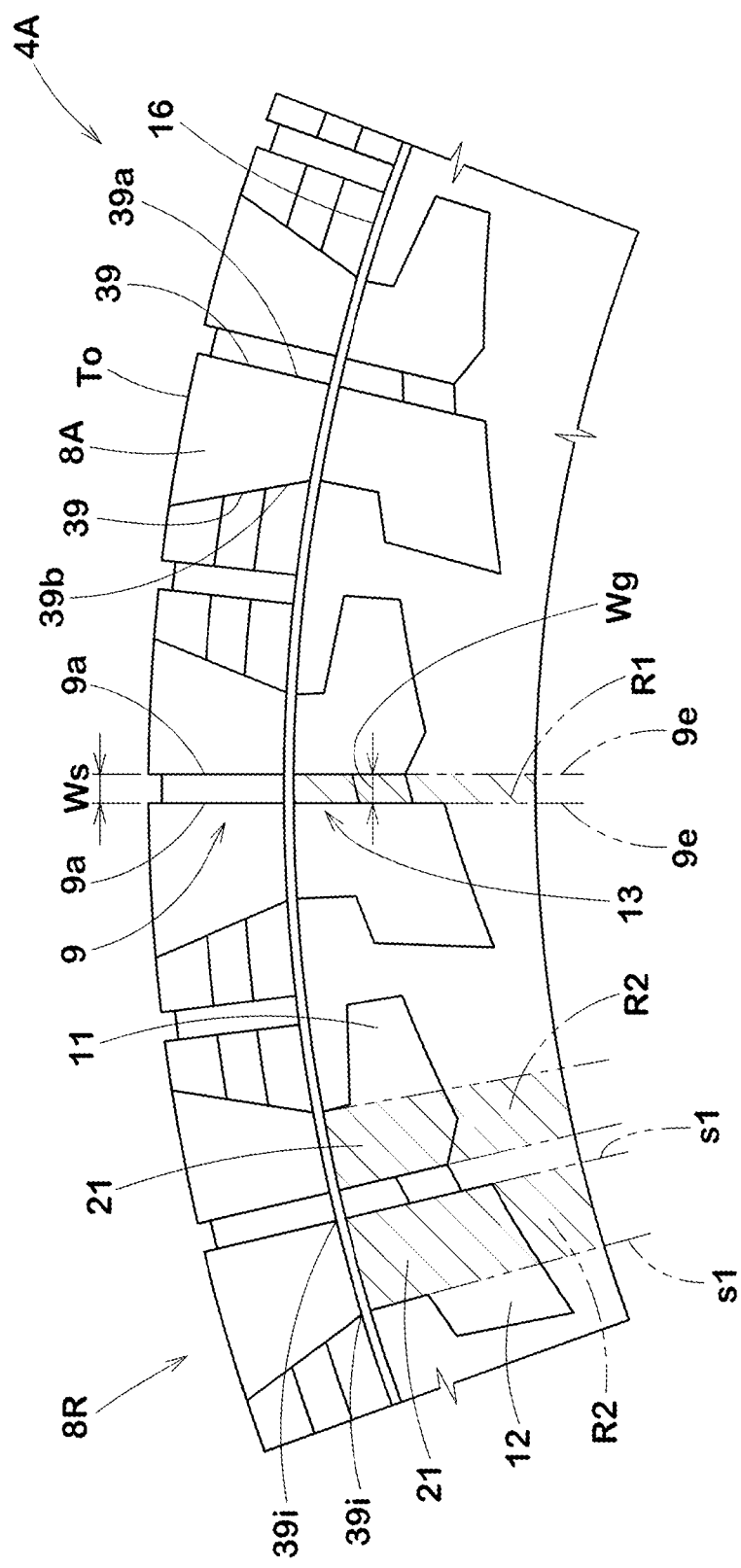
FIG. 8 is a front view of the first buttress portion.

FIG. 8 is a front view of the first buttress portion 4A. As illustrated in FIG. 8, the shoulder blocks 8R, in the present embodiment, include outward facing surfaces 8A that extend inwardly in the tire radial direction from the first tread edge To to form a part of the first buttress portion 4A. The outward facing surfaces 8A, for example, include a plurality of pairs of block edges 39, each pair separating in the tire circumferential direction and extending in the tire radial direction. Each block edge 39 connects the first tread edge To and the recess 16 and extends in a straight manner. Each pair of block edges 39 include a first block edge 39a forming one of groove edges of the shoulder lateral groove 9 and a second block edge 39b that is inclined at an angle with respect to the tire radial direction greater than that of the first block edge 39a. The second block edge 39b, for example, is inclined toward the first block edge 39a while extending inwardly in the tire radial direction.

In the present embodiment, the shoulder lateral grooves 9 extend outwardly in the tire axial direction from the first tread edge To. In other words, the shoulder lateral grooves 9 extend on the first buttress portion 4A. Thus, a plurality of pairs of groove edges 9a and 9a extending in the longitudinal direction of the shoulder lateral groove 9 are formed in the first buttress portion 4A. In the present embodiment, each groove edge 9a extends in a straight manner. Each groove edge 9a, for example, is connected to the recess 16.

Each groove 13 is located at least partially overlapping with one of projected areas R1 of the shoulder lateral grooves 9 inwardly in the tire radial direction. Each projected area R1 is a region surrounded by a pair of extension lines 9e in which each pair of groove edges 9a is virtually extended inward in the tire radial direction. In FIG. 8, one of the projected areas R1 is shown by hatching. In this embodiment, the entire region of each groove 13 is located overlapping with the respective projected areas R1.

A groove width Wg of the grooves 13 is preferably equal to or more than 90% of a groove width Ws of the shoulder lateral grooves 9, more preferably equal to or more than 95%, but preferably equal to or less than 110%, more preferably equal to or less than 105%. When the width Wg of the grooves 13 is 90% or more of the groove width Ws of the shoulder lateral grooves 9, the mud traction performance can be improved. When the width Wg of the grooves 13 is 110% or less of the groove width Ws of the shoulder lateral grooves 9, the cut resistance can be maintained high. The width Wg of the grooves 13, for example, is preferably in a range from 20% to 40% of the maximum length Wa (shown in FIG. 3) of the inner portion 20. In addition, the groove width Ws of the shoulder lateral grooves 9 is preferably in a range from 3.7 to 9.7 mm.

Each outer portion 21 is located at least partially overlapping with one of projected areas R2 that are projections of the shoulder blocks 8R inward in the tire radial direction. Each projected area R2 is an area surrounded by a pair of tire radial lines s1 passing through the inner ends 39i of the block edges 39 of each shoulder block 8R. In FIG. 8, two projected areas R2 are shown by hatching. In the present embodiment, the entire regions of the outer portions 21 are located overlapping with the respective projected areas R2. More specifically, the entire outer portions 21 of the first protectors 11 and the entire outer portions 21 of the second protectors 12 are located overlapping with the respective projected areas R2. This can increase the apparent stiffness of the protectors 10 and the shoulder blocks 8R and further improve the mud traction performance.

Figure 9A:
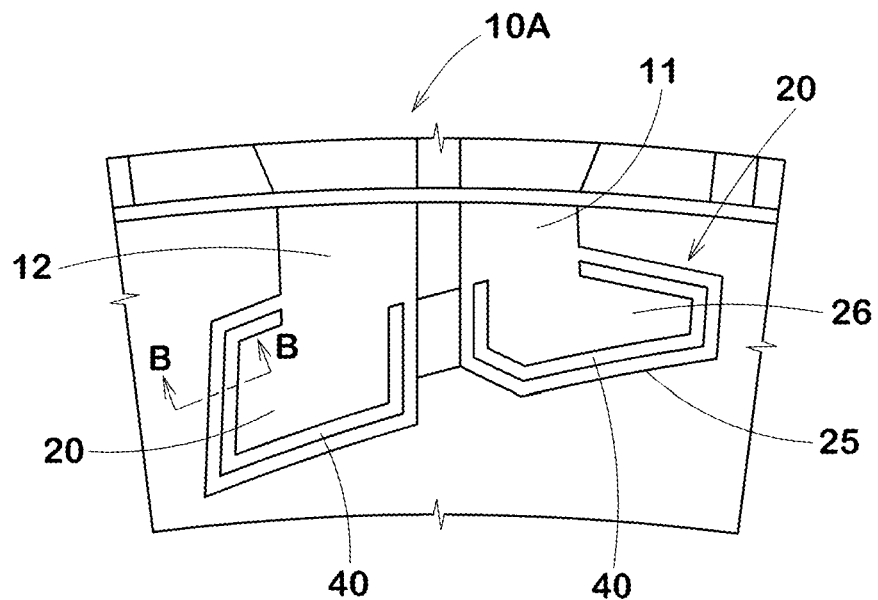
FIG. 9A is a front view of a set of protectors according to another embodiment.
Figure 9B:
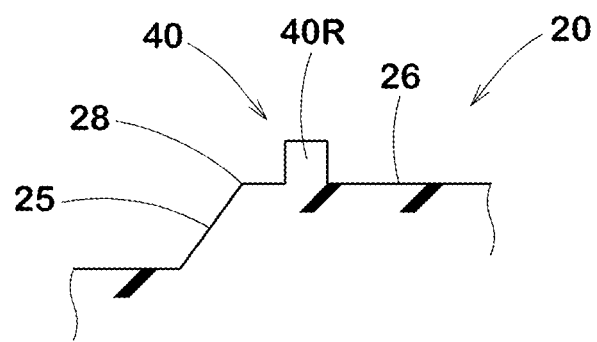
FIG. 9B is a cross-sectional view taken along the line B-B of FIG. 9A.

FIG. 9A is a front view of a set 10A of protectors. FIG. 9B is a cross-sectional view taken along the line B-B of FIG. 9A. The same elements as in the present set 10A of protectors are denoted with the same reference signs and their descriptions may be omitted. As illustrated in FIGS. 9A and 9B, the top surface 26 of the inner portion 20 is provided with a border portion 40 extending along the outer edge 28 of the side surface 25. In the present embodiment, the border portion 40 is formed as a rib 40R protruding from the top surface 26. Such a border portion 40 can change the visibility of protectors 10 and improve the appearance performance. Preferably, the border portion 40 may be formed in the inner portions 20 of the first protectors 11 and the second protectors 12. Preferably, the border portion 40 is not formed in the outer portions 21. Furthermore, the border portion 40 may be formed by two or more ribs 40R (not illustrated) extending along the side surface 25, for example.

Figure 9C:
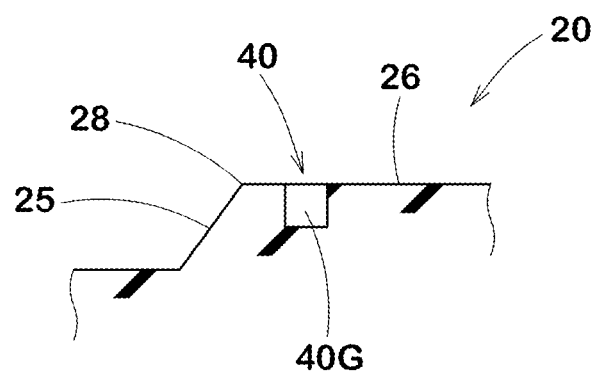
FIG. 9C is a cross-sectional view taken along the line B-B of FIG. 9A according to another embodiment.

FIG. 9C is a cross-sectional of another embodiment of border portion 40 taken along the line B-B of FIG. 9A. As illustrated in FIG. 9C, the border portion 40 is formed as a groove 40G recessed from the top surface 26. Such a border portion 40 can also change the visibility of protectors 10 and improve the appearance performance.

Although the particularly preferred embodiments of the present disclosure have been described in detail above, the present disclosure is not limited to the embodiments shown in drawings.

EXAMPLE

Tires having the basic structure shown in FIG. 1 and having the buttress portion shown in FIG. 2 were prepared, and their mud traction performance, cut resistance, tire mass and appearance performance were evaluated. The test methods and common specifications are as follows.
Tire size: 265/65R18
Rim: 8.0 J
Internal pressure: 230 kPa
In each example, "Wg" and "Wa" are the same.
Mad Traction Performance Test:
Each test tire was mounted on all wheels of a four-wheel drive vehicle with a displacement of 3500 cc. Then, a test driver drove the vehicle on a test course of a muddy road surface, and the driving characteristics related to traction were evaluated by the sensuality of the test driver. The results are shown in Tables 1 and 2 by a score of 100 for Comparative Example 1. The larger the value, the greater the traction and the better the mud traction performance.
Cut Resistance Teste:
A test driver drove the vehicle about 1500 km on a rocky road surface containing rocks and rubble. Then, the cut resistance was evaluated based on the depth of the cut scratches and the length of the cut scratches on the outer surface of the buttress portion. The results are shown in Tables 1 and 2 by a score of 100 for Comparative Example 1. The larger the value, the smaller the cut scratches and the better the cut resistance.
Tire Mass Test:
The mass of the first buttress portion of each test tire was measured. The results are shown in Tables 1 and 2 by an exponent with the reciprocal of the mass (kg) of Comparative Example 1 as 100. The larger the value, the smaller and better the mass. Note that tires with a small mass have excellent rolling resistance.
Appearance Performance Test:
Ten test drivers evaluated the beauty and visibility of the first buttress portion sensually. The results are shown in Tables by a score (average score of 10 people) with Comparative Example 1 as 100. The larger the value, the better the appearance performance.

The test results are shown in Tables 1 and 2. Test tires with cut resistance, mud performance, or tire mass less than 95 are considered to be rejected. The border portion of Example 15 is as shown in FIG. 9B.

TABLE 1

|  | Comparative ex. 1 | Comparative ex. 2 | Ex. 1 | Ex. 2 | Ex. 3 | Ex. 4 | Ex. 5 | Ex. 6 | Ex. 7 |
|---|---|---|---|---|---|---|---|---|---|
| h1a (mm) | 3 | 3 | 3 | 3 | 3 | 3 | 3 | 3 | 3 |
| h1b (mm) | 3 | 3 | 3 | 3 | 3 | 3 | 3 | 3 | 3 |
| Presence or absence of grooves | absence | presence | presence | presence | presence | presence | presence | presence | presence |
| L1/La (%) | — | 100 | 25 | 20 | 30 | 10 | 40 | 25 | 25 |
| Wg/Ws (%) | — | 100 | 100 | 100 | 100 | 100 | 100 | 90 | 110 |
| h2 (mm) | — | 1.5 | 1.5 | 1.5 | 1.5 | 1.5 | 1.5 | 1.5 | 1.5 |
| Wb/Wa (%) | — | 60 | 60 | 60 | 60 | 60 | 60 | 60 | 60 |
| Presence or absence of border portions | absence | absence | absence | absence | absence | absence | absence | absence | absence |
| Mud traction performance [score: larger is better.] | 100 | 115 | 120 | 120 | 118 | 122 | 118 | 118 | 122 |
| Cur resistance [score: larger is better.] | 100 | 112 | 110 | 110 | 110 | 110 | 112 | 110 | 108 |
| Tire mass [index: larger is better.] | 100 | 95 | 100 | 100 | 100 | 102 | 98 | 101 | 99 |
| Appearance performance [score: lager is better.] | 100 | 98 | 102 | 102 | 102 | 102 | 102 | 102 | 102 |

TABLE 2

|  | Ex. 8 | Ex. 9 | Ex. 10 | Ex. 11 | Comparative ex. 3 | Ex. 12 | Ex. 13 | Ex. 14 | Ex. 15 |
|---|---|---|---|---|---|---|---|---|---|
| h1a (mm) | 3 | 3 | 1 | 5 | 0.5 | 6 | 3 | 3 | 3 |
| h1b (mm) | 3 | 3 | 1 | 5 | 0.5 | 6 | 3 | 3 | 3 |
| Presence or absence of grooves | presence | presence | presence | presence | presence | presence | presence | presence | presence |
| L1/La (%) | 25 | 25 | 25 | 25 | 25 | 25 | 25 | 25 | 25 |
| Wg/Ws (%) | 80 | 120 | 100 | 100 | 100 | 100 | 100 | 100 | 100 |
| h2 (mm) | 1.5 | 1.5 | 0.5 | 3.5 | 0.5 | 4.5 | 1.5 | 1.6 | 1.5 |
| Wb/Wa (%) | 60 | 60 | 60 | 60 | 60 | 60 | 40 | 90 | 60 |
| Presence or absence of border portions | absence | absence | absence | absence | absence | absence | absence | absence | presence |
| Mud traction performance [score: larger is better.] | 115 | 123 | 112 | 125 | 98 | 125 | 116 | 122 | 120 |
| Cur resistance [score: larger is better.] | 112 | 106 | 106 | 110 | 105 | 108 | 110 | 106 | 110 |
| Tire mass [index: larger is better.] | 102 | 97 | 103 | 98 | 103 | 96 | 100 | 98 | 99 |
| Appearance performance [score: lager is better.] | 102 | 102 | 90 | 105 | 85 | 105 | 98 | 98 | 108 |

As a result of the test, it was confirmed that the tires of the examples have improved cut resistance and mud traction performance compared to those in the comparative example tires. It was also confirmed that the increase in the mass of the tire was suppressed.

[Additional Notes]

The present disclosure includes the following aspects.

[Note 1]

A pneumatic tire comprising:
  a tread portion having a first tread edge, and
  a first buttress portion extending inwardly in a tire radial direction from the first tread edge, wherein
  the first buttress portion is provided with a plurality of protectors protruding outwardly in a tire axial direction,
  the plurality of protectors comprises a set of protectors comprising a first protector and a second protector arranged adjacent to the first protector via a groove extending in the tire radial direction,
  the groove is provided with a tie-bar connecting the first protector and the second protector,
  the tie-bar is partially formed in a tire radial region of the groove, and
  the tie-bar has a protruding height that is smaller than a protruding height of the first protector and a protruding height of the second protector.

[Note 2]

The pneumatic tire according to note 1, wherein
  a length in the tire radial direction of the tie-bar is equal to or less than 50% of a length in the tire radial direction of the groove.

[Note 3]

The pneumatic tire according to note 1 or 2, wherein
  a difference (h1$a$-h2) between the protruding height h1$a$ of the first protector and the protruding height h2 of the tie-bar, and a difference (h1$b$-h2) between the protruding height h1$b$ of the second protector and the protruding height h2 of the tie-bar are equal to or more than 0.5 mm.

[Note 4]

The pneumatic tire according to any one of notes 1 to 3, wherein the protruding heights h1$a$ and h1$b$ of the first protector and the second protector, respectively, are in a range from 1.0 to 5.0 mm.

[Note 5]

The pneumatic tire according to any one of notes 1 to 4, wherein the tread portion comprises a shoulder land portion inside the tire axial direction from the first tread edge, the shoulder land portion is divided into a plurality of shoulder blocks by a plurality of shoulder lateral grooves communicated with the first tread edge, and the groove is located at least partially overlapping with one of projected areas of the shoulder lateral grooves inwardly in the tire radial direction.

[Note 6]

The pneumatic tire according to note 5, wherein a width of the groove is in a range from 90% to 110% of a groove width of the shoulder lateral grooves.

[Note 7]

The pneumatic tire according to any one of notes 1 to 6, wherein each of the first protector and the second protector comprises an inner portion and an outer portion located outwardly in the tire radial direction of the inner portion, and a maximum length in a tire circumferential direction of the inner portion is greater than a maximum length in the tire circumferential direction of the outer portion.

[Note 8]

The pneumatic tire according to note 7, wherein the tie-bar connects the inner portions of the first protector and the second protector.

[Note 9]

The pneumatic tire according to any one of notes 1 to 8, wherein in a front view of each protector of the first buttress portion, the first protector has an L-shape in which the inner portion thereof protrudes from the outer portion thereof to an opposite side of the groove in the tire circumferential direction, and the second protector has an inverted L-shape in which the inner portion thereof protrudes from the outer portion thereof to an opposite side of the groove in the tire circumferential direction.

[Note 10]

The pneumatic tire according to any one of notes 7 to 9, wherein each of the first protector and the second protector comprises a side surface that extends to an outer edge thereof in the tire axial direction from an outer surface of the first buttress portion, and a top surface enclosed by the outer edge of the side surface, and the top surface of the inner portion is provided with a border portion extending along the outer edge of the side surface.

The invention claimed is:

1. A pneumatic tire comprising:

a tread portion having a first tread edge, and a first buttress portion extending inwardly in a tire radial direction from the first tread edge, wherein the first buttress portion is provided with a plurality of protectors protruding outwardly in a tire axial direction, the plurality of protectors comprises a set of protectors comprising a first protector and a second protector arranged adjacent to the first protector via a protector groove extending in the tire radial direction, each of the first protector and the second protector comprises an inner portion and an outer portion located outwardly in the tire radial direction of the inner portion, wherein a maximum length in a tire circumferential direction of the inner portion is greater than a maximum length in the tire circumferential direction of the outer portion, in a front view of each protector of the first buttress portion, the first protector has an L-shape in which the inner portion thereof protrudes from the outer portion thereof to an opposite side of the protector groove in the tire circumferential direction, and the second protector has an inverted L-shape in which the inner portion thereof protrudes from the outer portion thereof to an opposite side of the protector groove in the tire circumferential direction, the protector groove is provided with a tie-bar connecting the first protector and the second protector, the tie-bar is partially formed in a tire radial region of the groove, the tie-bar has a protruding height that is smaller than a protruding height of the first protector and a protruding height of the second protector, and in the set of protectors, the outer portion of the first protector and the outer portion of the second protector are not connected by the tie-bar.

2. The pneumatic tire according to claim 1, wherein a length in the tire radial direction of the tie-bar is equal to or less than 50% of a length in the tire radial direction of the protector groove.

3. The pneumatic tire according to claim 1, wherein a difference (h1$a$–h2) between the protruding height h1$a$ of the first protector and the protruding height h2 of the tie-bar, and a difference (h1$b$–h2) between the protruding height h1$b$ of the second protector and the protruding height h2 of the tie-bar are equal to or more than 0.5 mm.

4. The pneumatic tire according to claim 1, wherein the protruding heights h1$a$ and h1$b$ of the first protector and the second protector, respectively, are in a range from 1.0 to 5.0 mm.

5. The pneumatic tire according to claim 1, wherein the tread portion comprises a shoulder land portion inside the tire axial direction from the first tread edge, the shoulder land portion is divided into a plurality of shoulder blocks by a plurality of shoulder lateral grooves communicated with the first tread edge, and the protector groove is located at least partially overlapping with one of projected areas of the shoulder lateral grooves inwardly in the tire radial direction.

6. The pneumatic tire according to claim 5, wherein a width of the protector groove is in a range from 90% to 110% of a groove width of the shoulder lateral grooves.

7. The pneumatic tire according to claim 5, wherein an entire region of the protector groove is located overlapping with one of projected areas.

8. The pneumatic tire according to claim 1, wherein the tie-bar connects the inner portions of the first protector and the second protector.

9. The pneumatic tire according to claim 1, wherein
each of the first protector and the second protector comprises a side surface that extends to an outer edge thereof in the tire axial direction from an outer surface of the first buttress portion, and a top surface enclosed by the outer edge of the side surface, and
the top surface of the inner portion is provided with a border portion extending along the outer edge of the side surface.

10. The pneumatic tire according to claim 9, wherein the border portion is a rib protruding from the top surface.

11. The pneumatic tire according to claim 9, wherein the border portion is a groove recessed from the top surface.

12. The pneumatic tire according to claim 1, wherein the maximum length Wb of the outer portion is in a range of from 50% to 80% of the maximum length Wa of the inner portion.

13. The pneumatic tire according to claim 1, wherein a width of the protector groove is in a range from 20% to 40% of the maximum length of the inner portion.

14. A pneumatic tire comprising:
a tread portion having a first tread edge,
the tread portion comprising a shoulder land portion inside the tire axial direction from the first tread edge and the shoulder land portion being divided into a plurality of shoulder blocks by a plurality of shoulder lateral grooves that communicate with the first tread edge, and
a first buttress portion extending inwardly in a tire radial direction from the first tread edge, wherein
the first buttress portion is provided with a plurality of protectors protruding outwardly in a tire axial direction,
the plurality of protectors comprises a set of protectors comprising a first protector and a second protector arranged adjacent to the first protector via a protector groove extending in the tire radial direction,
each of the first protector and the second protector comprises an inner portion and an outer portion located outwardly in the tire radial direction of the inner portion, wherein a maximum length in a tire circumferential direction of the inner portion is greater than a maximum length in the tire circumferential direction of the outer portion,
in a front view of each protector of the first buttress portion,
the first protector has an L-shape in which the inner portion thereof protrudes from the outer portion thereof to an opposite side of the protector groove in the tire circumferential direction, and
the second protector has an inverted L-shape in which the inner portion thereof protrudes from the outer portion thereof to an opposite side of the protector groove in the tire circumferential direction,
the protector groove is provided with a tie-bar connecting the first protector and the second protector,
the tie-bar is partially formed in a tire radial region of the protector groove,
the tie-bar has a protruding height that is smaller than a protruding height of the first protector and a protruding height of the second protector,
the protector groove is located at least partially overlapping with one of projected areas of the shoulder lateral grooves inwardly in the tire radial direction, and
an entire region of the protector groove is located overlapping with one of the projected areas.

15. A pneumatic tire comprising:
a tread portion having a first tread edge, and
a first buttress portion extending inwardly in a tire radial direction from the first tread edge, wherein
the first buttress portion is provided with a plurality of protectors protruding outwardly in a tire axial direction,
the plurality of protectors comprises a set of protectors comprising a first protector and a second protector arranged adjacent to the first protector via a protector groove extending in the tire radial direction,
each of the first protector and the second protector comprises an inner portion and an outer portion located outwardly in the tire radial direction of the inner portion, wherein a maximum length in a tire circumferential direction of the inner portion is greater than a maximum length in the tire circumferential direction of the outer portion,
in a front view of each protector of the first buttress portion,
the first protector has an L-shape in which the inner portion thereof protrudes from the outer portion thereof to an opposite side of the protector groove in the tire circumferential direction, and
the second protector has an inverted L-shape in which the inner portion thereof protrudes from the outer portion thereof to an opposite side of the protector groove in the tire circumferential direction,
the protector groove is provided with a tie-bar connecting the first protector and the second protector,
the tie-bar is partially formed in a tire radial region of the protector groove,
the tie-bar has a protruding height that is smaller than a protruding height of the first protector and a protruding height of the second protector,
each of the first protector and the second protector comprises a side surface that extends to an outer edge thereof in the tire axial direction from an outer surface of the first buttress portion, and a top surface enclosed by the outer edge of the side surface, and
the top surface of the inner portion is provided with a border portion extending along the outer edge of the side surface.

* * * * *